Patented Dec. 5, 1944

2,364,343

UNITED STATES PATENT OFFICE 2,364,343

RECOVERY OF FILM SCRAP

Hans T. Clarke, New York, and Joseph Gail Stampfli, Rochester, N. Y., assignors to Eastman Kodak Company, Rochester, N. Y., a corporation of New Jersey No Drawing. Application February 19, 1942, Serial No. 431,610

5 Claims. (Cl. 8—102)

This invention relates to processes of treating film scrap having dye coatings thereon with ozone to discharge the dye therefrom, particularly after the film scrap has first been suspended in aqueous acetic acid.

Sometimes photographic film scrap which is to be worked up to recover the film base ester therefrom has one or more dye coatings thereon. Various methods have been proposed for removing the dyes from the film scrap. The use of organic solvents to remove the coloring material has been suggested. This method is satisfactory but is expensive and therefore its usefulness is limited. No thoroughly satisfactory aqueous agent for removing the dye has been proposed up to our invention. Although sodium hypochlorite in aqueous solution will sometimes or often discharge the dyes present on film scrap, there results a chloride residue in the film scrap. This residue is difficult to wash out of the cellulose esters obtained and the residual chlorides which cannot be removed render the recovered cellulose esters unsuitable for photographic purposes. Also, the solutions of the chlorine bleached cellulose esters in organic solvents show much more corrosion of metallic treatment vessels than the solutions of cellulose esters which are free of chlorides in like organic solvents.

One object of our invention is to provide a process of treating photographic film scrap to discharge the dye therefrom which is inexpensive, employs only aqueous treatment, is more powerful than hypochlorite and leaves no undesirable residues in the cellulose ester recovered from the film scrap. Other objects of our invention will appear herein.

We have found that a stream of ozone passed through a stirred suspension in water or aqueous acetic acid of waste photographic film, to which dye layers are attached, at room temperature will discharge the dyes from the scrap in a short time. We have found that the dye color is discharged from the scrap more completely by ozone than by hypochlorite solution and that no undesirable residue is left in the film scrap. We have found that the film base is not hydrolyzed or otherwise harmed by the treatment in accordance with our invention.

Our invention is preferably carried out by first chopping or otherwise cutting up the scrap into small pieces so that it can be stirred readily when in a large body of water. The size of the pieces into which the scrap is cut is a matter of choice for the individual operator. It has been our experience that where the film scrap recovery operation is carried out on a large scale using large-size equipment, the pieces may vary from one inch up to two or three inches. With smaller equipment, however, it is ordinarily desirable that the pieces be not more than one inch and preferably less. Any size pieces, however, which can be stirred satisfactorily in the equipment employed, will be suitable for use in the process in accordance with our invention. After comminuting the scrap it is placed in a large amount of water, preferably distilled water or tap water with a lowered pH, so as to be completely immersed and preferably with an amount which permits good stirring. We have found that the color discharge operation is facilitated particularly with the more difficultly removable dyes by the presence of acetic acid of at least 10% up to a concentration of 30% or even up to 50%. Also elevating the temperature increases the dye-discharging effect of the ozone. In no case, however, has a temperature as high as boiling been found necessary, or even desirable, but if desired an autoclave or other enclosed vessel could be employed with a temperature of at least 100° C., although the difficulties attendant upon the operation of such a set-up would preclude its use under ordinary circumstances.

The mass of water and comminuted scrap is agitated while ozone is bubbled therethrough until the color is completely discharged. The time required for the treatment depends on the difficulty of discharging the dye present, whether or not acetic acid is present, the rate at which the ozone is bubbled through the mass, the type of film base treated, as well as the other conditions which are present. For instance, it was found in one case that a concentration of acetic acid of 20–30% gave the same dye-discharging effect in one-half the time required for discharging the dye when the scrap was suspended in water only. In some cases acetic acid is necessary if satisfactory discharge of the dye is to be obtained. Other acids may be employed to increase the effectiveness of the ozone, providing the acid does not cause any appreciable hydrolysis of the film base ester and is not employed in too great an amount. Such acids will be referred to herein as "nonhydrolyzing acids." For instance, phosphoric acid may be added to the water in which the scrap is suspended so as to impart a pH below 7 such as down to 4 or even lower. No chlorine-containing acid should be employed for this purpose for the reasons pointed out above.

This invention is adapted for use with either the scrap of cellulose nitrate film or that in which an organic acid ester of cellulose such as cellulose acetate, cellulose acetate propionate or cellulose acetate butyrate is employed for the base. It is desirable that the photographic emulsion layer and any other gelatin layers be first removed from the scrap such as by a washing with warm water before the treatment in accordance with our invention, particularly if an elevated temperature is to be employed.

Some of the dyes which are employed in connection with photographic film are the nigrosines, the triphenyl methane dyes, azo dyes and the amino-anthraquinones. For instances, dyes such as Helvetia green and acid magenta have been employed in backing layers for photographic film. Although various types of photographic film scrap containing dyes were treated in accordance with our invention, the removal of the dye was accomplished in every case. However, with some dye types, particularly some of the aminoanthraquinone dyes, it was necessary to employ aqueous acetic acid as the suspending liquid to obtain a complete removal of the color therefrom.

The following examples illustrate this invention:

Example I 40 parts of chopped film scrap, which was made with a cellulose acetate butyrate base containing 32% acetyl and 16% butyryl and which had in it a blue dye, was stirred in 800 parts of distilled water at room temperature while a stream of ozonized oxygen was bubbled therethrough. The color all appeared to be discharged in 10 to 15 minutes but the ozone was passed in for 25 minutes. The support was then rinsed in several changes of distilled water and was then treated to remove the subbing layer therefrom. The product gave a grain-free, colorless solution in a solvent composed of equal parts of propylene and ethylene chlorides.

Example II 40 parts of chopped film support of the same type as employed in Example I, except that it was colored with a mixture of a blue and a red dye, was stirred in 850 parts of aqueous acetic acid of 30% concentration at room temperature. A stream of ozonized oxygen was bubbled through the suspension for 1¾ hours during which time the colors of both dyes were discharged. The support was rinsed in several changes of distilled water and treated to remove the subbing layers A solution of the product in a mixture of equal parts of propylene and ethylene chlorides was grain-free, clear and colorless.

Example III 40 parts of the same kind of film support as used in Example II was stirred in 800 parts of 3% acetic acid at room temperature while a stream of ozonized air was bubbled therethrough. The blue color was discharged in 5 to 10 minutes and the red color after about two hours. The support was thoroughly washed and the subbing layers present were removed. A solution of the product in a mixture of equal parts of ethylene and propylene chlorides was grain-free, clear and colorless.

Example IV 36 pounds of wet cellulose nitrate film scrap, colored on the surface with a gray dye, was chopped into small pieces and the emulsion layer removed therefrom. The scrap was used wet to reduce the danger from inflammability. 36 pounds of wet nitrate scrap is equivalent to about 27 pounds of dry material. The scrap was stirred in 75 to 80 gallons of tap water, the pH of which had been lowered to 4 with phosphoric acid. A stream of ozone supplied by an ozinizing apparatus was bubbled through the mass. Oxygen was run into the ozonizing apparatus at the rate of 10 liters per minute. The treatment was continued for 21 hours at a temperature of approximately 100° F. The resulting product was washed with several changes of water. A small sample thereof was dried and dissolved and was found to give a solution having very little color.

Example V 36 pounds of chopped, wet, nitrate, gray film scrap was stirred in 90 to 100 gallons of a 25% solution of acetic acid in tap water. A stream of ozone was passed into the mass as in the preceding example, the treatment being continued for 13 hours at a temperature of 82 to 85° F. The gray coloration was gone at the end of 5 hours but a brown color remained. At the end of 10 hours all the color appeared to have been discharged but the treatment was continued 3 hours longer to make sure of good color in the product. The resulting product dissolved in volatile solvents to form a solution having good clarity.

We claim:

1. A method of discharging the color from dye-containing photographic film scrap which comprises treating the scrap with ozone in an aqueous bath having a pH of less than 7, which bath is free of chlorine compounds for a time sufficient to accomplish the discharge of the color present.

2. A method of discharging the color from dye-containing photographic film scrap, which comprise comminuting the scrap and treating the comminuted scrap with ozone in an aqueous bath having a pH of less than 7, which bath is free of chlorine compounds, for a time sufficient to accomplish the discharge of the color present.

3. A method of discharging the color from dye-containing photographic film scrap which comprises treating the scrap with ozone in an aqueous acetic acid bath of not more than 50% concentration, which bath is free of chlorine compounds for a time sufficient to accomplish the discharge of the color present.

4. A method of discharging the color from dye-containing photographic film scrap which comprises treating the scrap with ozone in an aqueous acetic acid bath of 25% concentration for a sufficient time to accomplish the discharge of the color present.

5. A method of discharging the color from dye-containing photographic film scrap which comprises comminuting the scrap and treating the comminuted scrap with ozone in an aqueous bath of 20 to 30 per cent concentration free of chlorine compounds for a time sufficient to accomplish the discharge of the color present.

HANS T. CLARKE.
JOSEPH GAIL STAMPFLI.

CERTIFICATE OF CORRECTION.

Patent No. 2,364,343.  December 5, 1944.

HANS T. CLARKE, ET AL.

It is hereby certified that error appears in the printed specification of the above numbered patent requiring correction as follows: Page 2, first column, line 64, for "3%" read --30%--; and second column, line 66, claim 5, after the word "aqueous" insert --acetic acid--; and that the said Letters Patent should be read with this correction therein that the same may conform to the record of the case in the Patent Office.

Signed and sealed this 10th day of April, A. D. 1945.

Leslie Frazer (Seal)  Acting Commissioner of Patents.